Patented Aug. 22, 1950

2,520,083

UNITED STATES PATENT OFFICE 2,520,083

BLENDED OLEFINIC COPOLYMERS

Earl C. Chapin and George E. Ham, Dayton, Ohio, assignors to Monsanto Chemical Company, St. Louis, Mo., a corporation of Delaware No Drawing. Application July 29, 1948, Serial No. 41,404

2 Claims. (Cl. 260—45.5)

This invention relates to new plastic compositions having unusual physical properties, which make them particularly adaptable to the fabrication of flexible films. More specifically the invention relates to blended copolymers having properties not possessed by either component.

In copending application, Serial No. 29,951, filed May 28, 1948, by Earl C. Chapin and George E. Ham, there are described and claimed copolymers of acrylonitrile, vinyl acetate, and alkyl acrylates having from 3 to 12 carbon atoms in the alkyl radical. These copolymers have unusual tensile strength, flexibility and toughness at temperatures usually encountered in most applications. When these films are to be subjected to wide variations in temperature they may become too stiff at low temperatures and too soft at higher temperatures.

The primary purpose of this invention is to provide a method of modifying copolymers of acrylonitrile, vinyl acetate and the alkyl acrylates, particularly butyl acrylate, and thereby to improve the utility of the copolymer. A further purpose of the invention is to provide a new plastic composition having useful and desirable properties over a wide range of temperatures.

The relationship between temperature and stiffness of a plastic composition is most conveniently evaluated by a procedure known as the Clash-Berg test. In accordance with this procedure a copolymer sample is prepared by compression molding to form a standard sized bar which is then cooled to a temperature of approximately −50° C. and permitted to warm gradually to room temperature while measuring the deflection by the application of a constant torque. The stiffness modulus may thus be readily determined over the entire range of temperatures to which the sample is subjected. It is generally recognized that plastic compositions which have a stiffness modulus in excess of 135,000 pounds per square inch at 25° C. are too inflexible for many applications, and that the stiffness modulus should not be less than 2000 pounds per square inch which is the lower limit of practical utility. For every plastic composition of appreciable strength there is a temperature at which the stiffness modulus is 135,000 pounds per square inch and another temperature at which the stiffness modulus is 2000 pounds per square inch. Obviously a plastic composition will be of general utility only at temperatures between the critical temperatures where the maximum and minimum stiffness moduli are experienced. The difference between these temperatures is known as the "stifflex range" and is an effective measurement of the utility of the plastic composition. The temperature at which the composition has a modulus of elasticity of 135,000 pounds per square inch is known as the "flex temperature" and represents the minimum temperature at which desirable flexibility properties are found.

In general a plastic composition will have some utility regardless of its "flex temperature" and "flex range," but compositions having the lowest flex temperature and the broadest flex range are most desirable and have most universal application. A plastic composition should have a flex temperature lower than 10° C., a stifflex range in excess of 30° C., and the normal room temperatures (15 to 25° C.) included within the stifflex range. Compositions having these properties will have desired flexibility throughout the entire range of temperatures usually encountered in most applications as wrapping films.

In accordance with this invention it is found that by blending copolymers with undesirable flexibility properties new compositions having desirable flex properties may be prepared. Copolymers of 5 to 30 percent of acrylonitrile, 50 to 75 percent of vinyl acetate and 20 to 50 percent of butyl acrylate have desirable tensile strength and toughness but frequently have flex temperatures which are too high for use over a practicable temperature range, and too narrow a flex range to be useful even at temperatures above their high flex temperature. Similarly, copolymers of 25 to 60 percent of vinyl acetate and 40 to 75 percent of butyl acrylate have little utility because of their lack of tensile strength, their tacky surfaces and their narrow flex range. It has been found that blends of these two different types of copolymer have desirable flex temperatures and much wider flex ranges than either of the components. In the preparation of these blends from 35 to 65 percent of each of the two types of copolymers may be used, although the compositions of 40 to 60 percent of either component produce the optimum blended compositions.

Each of the copolymeric components may be prepared by any of the several well known polymerization methods, but polymerization in an aqueous emulsion is most desirable. In the preparation of the copolymers by aqueous emulsion polymerization the monomers may be contacted in the presence of water, a suitable peroxy catalyst, and preferably an emulsion stabilizing agent. If desired all of the monomers to be copolymerized may be charged to the polymerization reactor at the beginning of the reaction, but preferred practice involves the mixing of the monomers in a separate charging vessel, adding the mixture to the water maintained under conditions of polymerization in the presence of a suitable catalyst.

The emulsion polymerizations are catalyzed by means of any water soluble peroxy compound, for example sodium peroxide, hydrogen peroxide, sodium perborate, the sodium salts of other peroxy acids, the potassium, ammonium and other water soluble salts of peroxy acids, and any other water soluble compounds containing a peroxy radical. The quantity of peroxy compound may be from 0.01 to 1.0 percent by weight of the polymerizable compound. The catalyst may be charged at the beginning of the reaction, or it may be added continuously or in increments throughout the course of the reaction for the purpose of maintaining a more uniform concentration of catalyst in the reaction mass. The latter method is preferred because it tends to make the resultant polymer more uniform in physical and chemical properties.

Although the uniform distribution of the reactants throughout the reaction mass can be achieved by vigorous agitation, it is generally desirable to promote the uniform distribution of reagents by using surface active agents, or emulsion stabilizers. Suitable agents for this purpose are the water soluble salts of fatty acids, such as sodium oleate, and potassium stearate, mixtures of water soluble fatty acid salts, such as the common soaps prepared by the saponification of animal and vegetable oils, the "amino soaps," such as triethanolamine and dodecylmethylamine, salts of rosin acids and mixtures thereof, the water soluble salts of half esters of sulfuric acid and long chain alkyl alcohols, sulfonated hydrocarbons, such as alkylarylsulfonates, and any other of the wide variety of wetting agents, which are in general organic compounds containing both hydrophobic and hydrophilic radicals. The quantity of emulsifying agent will depend upon the particular agent selected, the ratio of monomer to be used, and the conditions of polymerization. In general, however, from 0.1 to 5 percent by weight of the monomers may be employed.

Emulsion polymerization reactions are conducted at elevated temperatures, but preferably at the reflux temperature of the emulsion which will usually be between 70° C. and 80° C. The polymerization temperatures should be maintained substantially constant, and by operation at reflux temperatures the monomers may be added at such rates that the temperature is maintained at a constant temperature, for example ±1° C. Under such conditions the optimum quality of the product is obtained.

The reaction is preferably initiated by charging the reactor with water containing the catalyst and emulsifier in solution, and thereafter increasing or decreasing the rate of mixed monomer addition as is required to maintain a constant reflux temperature. If desired the monomers may each be added in a separate stream. In order to avoid unduly high concentrations of emulsifier in the reaction mass at the beginning of the reaction, most of it may be mixed with the monomers and added therewith during the reaction. Preferably only a small proportion of the catalyst is charged at the beginning of the reaction, and the remainder is added either continuously or intermittently throughout the course of the reaction. The preferred manner of operation involves heating the water containing a small amount of catalyst and emulsifier to approximately the ultimate polymerization temperature, and initiating the reaction by introducing the stream of mixed monomers.

The emulsion polymerizations are preferably conducted in glass or glass-lined vessels, which are provided with means for agitating the contents thereof. Generally rotary stirring devices are the most effective means of insuring the intimate contact of the reagents, but other methods may successfully be employed, for example by rocking or tumbling the reactor. The polymerization equipment generally used is conventional in the art and the fundamental consideration involved in the selection of the equipment is the type of reaction contemplated.

The two copolymers may be blended on a roll mill, a Banbury mixer or any other conventional rubber mixing machinery.

Since both of the copolymeric components from the blend so prepared soften readily at elevated temperatures, the blend may be prepared in a dough mixer or other type of mixing machine adapted for mixing soft plastic materials if the mixer and the components to be blended are warmed to a temperature of 50 to 100° C. Other mixing methods may involve the partial dissolution in suitable organic solvents which may be readily removed subsequent to the mixing operation.

Although the principal use of the new blended compositions lies in the field of transparent films which are free of other plasticizing materials, special applications may involve the compounding of the blended copolymer with modifying substances, such as plasticizers, pigments, dyes, heat and light stabilizing materials, and other conventional additatives.

The new blended copolymers are of particular utility in the fabrication of flexible films suitable for raincoats, shoe soles, food wrapping, or any other application where low plasticizer migration and good stiffness-temperature characteristics are desirable. The blended copolymers are also suited to compression molding procedures because of their toughness and tensile strength.

Further details of the practice of this invention are set forth with respect to the following examples.

*Example 1*

A copolymer of 50 percent vinyl acetate, 20 percent acrylonitrile, and 30 percent of butyl acrylate was prepared by mixing the monomers and gradually charging the mixture to an aqueous medium containing a peroxide catalyst and an emulsion stabilizing agent, at the reflux temperature of the mixture. The resulting emulsion copolymer was directly dried and milled to a smooth uniform texture. A sample prepared by compression molding was found to have a flex temperature of +33° C., and a stiflex range of 8° C.

A second copolymer of 50 percent vinyl acetate and 50 percent butyl acrylate was prepared by the same method and found to have a flex temperature of −23° C., and a stiflex range of 25° C.

Equal parts of the two polymers were blended by milling for five minutes at 130° C. on Throppe rolls. The resulting blend was found to have a flex temperature of 6° C., and a stiflex range of 42° C.

Example 2

Using the procedure identical to that described in the preceding example a copolymer of 60 percent vinyl acetate, 10 percent acrylonitrile, and 30 percent butyl acrylate having a flex temperature of —13° and a stifflex range of 20° C. was blended with an equal proportion of a copolymer of 50 percent vinyl acetate and 50 percent butyl acrylate, having a flex temperature of —23° and a stifflex range of 25° C. The resulting blend was a clear, transparent composition having a flex temperature of —9° C., and a stifflex range of 34° C.

The invention involves the methods and products set forth in the following claims.

We claim:

1. A homogeneous transparent polymeric composition which comprises a blend of 35 to 65 parts by weight of a copolymer of a mixture of monomers consisting of 5 to 30 percent acrylonitrile, 50 to 75 percent vinyl acetate, and 20 to 50 percent of butyl acrylate, and from 65 to 35 parts by weight of a copolymer of a mixture of monomers consisting of 25 to 60 percent vinyl acetate and 40 to 75 percent of butyl acrylate.

2. A homogeneous transparent polymeric composition which comprises a blend of 40 to 60 parts by weight of a copolymer of a mixture of monomers consisting of 5 to 30 percent acrylonitrile, 50 to 75 percent vinyl acetate, and 20 to 50 percent of butyl acrylate, and from 60 to 40 parts by weight of a copolymer of a mixture of monomers consisting of 25 to 60 percent vinyl acetate and 40 to 75 percent of butyl acrylate.

EARL C. CHAPIN.
GEORGE E. HAM.

REFERENCES CITED

The following references are of record in the file of this patent:

UNITED STATES PATENTS

| Number | Name | Date |
|---|---|---|
| 2,123,599 | Fikentscher et al. | July 12, 1938 |
| 2,368,948 | Stallings | Feb. 6, 1945 |

FOREIGN PATENTS

| Number | Country | Date |
|---|---|---|
| 674,712 | Germany | Apr. 21, 1939 |